United States Patent
Scruggs et al.

[15] 3,676,484
[45] July 11, 1972

[54] SYNTHESIS OF HYDROXYALKYL ESTERS OF CARBOXYLIC ACIDS

[72] Inventors: Jack G. Scruggs; Donnie G. Brady, both of Bartlesville, Okla.

[73] Assignee: Phillips Petroleum Company

[22] Filed: Feb. 10, 1970

[21] Appl. No.: 10,273

[52] U.S. Cl..................260/475 P, 260/468 R, 260/485 G
[51] Int. Cl.........................................C07c 67/00
[58] Field of Search................260/475 P, 485 G, 468 R

[56] References Cited

UNITED STATES PATENTS

| | | | |
|---|---|---|---|
| 2,892,812 | 6/1959 | Helbing | 260/475 X |
| 2,910,490 | 10/1959 | Malkenus | 260/475 X |
| 3,062,786 | 11/1962 | Pengilly | 260/475 X |
| 3,140,309 | 7/1964 | Ardis et al. | 260/475 |
| 3,386,960 | 6/1968 | Wiener | 260/485 X |
| 3,404,174 | 10/1968 | Wygant | 260/485 |
| 3,414,608 | 12/1968 | Fiyita et al. | 260/475 |
| 3,459,788 | 8/1969 | Enoki et al. | 260/475 |
| 3,461,154 | 8/1969 | Lafont et al. | 260/475 |
| 3,056,818 | 10/1962 | Werber | 260/485 X |

FOREIGN PATENTS OR APPLICATIONS

| | | | |
|---|---|---|---|
| 924,639 | 4/1963 | Great Britain | |
| 1,126,564 | 9/1968 | Great Britain | 260/475 |

OTHER PUBLICATIONS

Cram et al., Organic Chemistry 2nd ed. (1964) pp. 286– 287.
March, Advanced Organic Chem. (1968) pp. 406– 407.
Conix, C. A. 8158f (Vol. 60).
Gevaert, C. A. (Vol. 57) 16869d.

*Primary Examiner*—Lorraine A. Weinberger
*Assistant Examiner*—Richard D. Kelly
*Attorney*—Young and Quigg

[57] ABSTRACT

Preparation of esters by reaction of halocarbinols with alkali metal carboxylates using phosphonium salts as catalysts to avoid otherwise undesired side reactions, such as polymerization, while providing effective yields of the desired esters.

12 Claims, No Drawings

SYNTHESIS OF HYDROXYALKYL ESTERS OF CARBOXYLIC ACIDS

This invention relates to a method of preparation of esters from halocarbinols and carboxylic acids. In another aspect, it relates to catalysts to promote the reaction of halocarbinols with carboxylic acids to form esters.

Heretofore, it has been known that alkylhalides will react with alkali metal salts of carboxylic acids at elevated temperatures to form the corresponding esters. However, when halocarbinols are involved, particularly with a hydroxy group in the 2, 3, or 4 position relative to the reactive halogen atom, a variety of competing reactions are involved such that the formation of the desired ester is, in effect, either lost in the shuffle or the productivity is seriously reduced. With the competition of side reactions and polymerization possibilities, at the necessary elevated temperatures for esterification, the formation of commercially suitable yields of the desired ester of a carbinol has not been obtainable.

For example, among the competing, and undesired, reactions involved are the following where X is a halide:

Ether formation

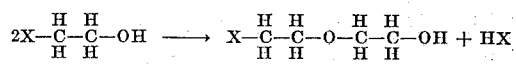

Cyclization

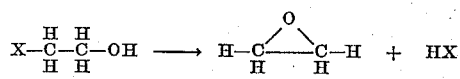

Poymerization

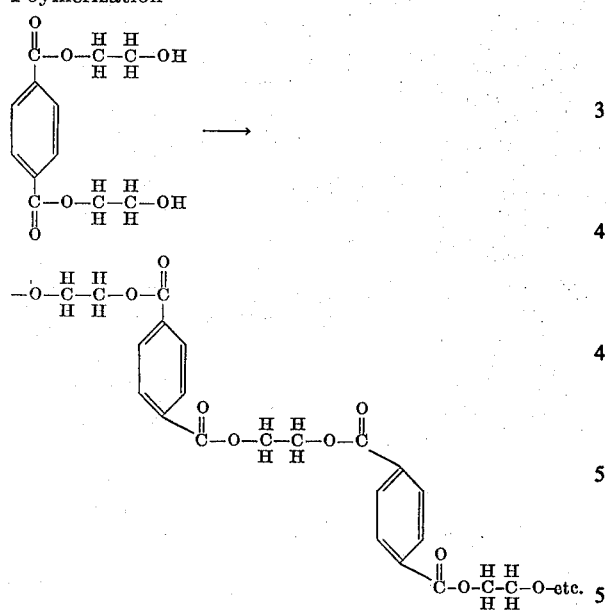

We have discovered that the reaction of a halocarbinol with an alkali metal salt of a carboxylic acid can be effectively catalyzed by the use of phosphonium salts. More particularly, we find that these catalyzed esterification reactions provide high yields, with minimal side reactions.

It is the object of our process to provide for improved preparation and improved yields of carbinol esters of hydrocarbon carboxylic acids by the use of phosphonium salts as catalysts.

An additional object of our invention is to provide catalysts to effectively promote the reaction of hydrocarbon carboxylic acid salts with halogen substituted alcohols in the formation of the corresponding esters.

The conversion or esterification reaction to which we refer is a catalyzed reaction between the alkali metal salt of a carboxylic acid containing up to four carboxylate groups

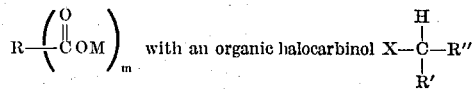

The number of carboxylate groups is represented by $m$ as an integer ranging from 1 to 4; M is an alkali metal selected from one or more of lithium, sodium, potassium, rubidium, and cesium; the R group is saturated aliphatic, saturated cycloaliphatic, aromatic, or combinations thereof such as saturated aliphatic-substituted aromatic, etc., having as many as 10 carbon atoms per R group, and the R group having a valence of $m$.

In the halocarbinol represented in the above reaction

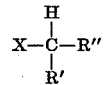

X is a halogen which can be chlorine, bromine, or iodine; R' is hydrogen, alkyl, alkenyl, aryl, cycloalkyl; or R' can be hydroxy-substituted alkyl, alkenylaryl or cycloalkyl; or R''. R'' is a hydroxy-substituted alkyl, aryl, or cycloalkyl. R' + R'' can have from 1 to 4 —OH groups; and the total of R' + R'' can have up to eight carbons. The halogen should not be on either of the carbons which are double bonded, due to interfering reactions that could ensue.

Other groups or substituents, nonreactive under the esterification conditions, can be present on R, R', R''. For example, the halocarbinol can contain another halogen, one or more, wherein one of the halogen atoms is on a tertiary carbon atom, since as far as the esterification reactions are concerned, such tertiary halide is nonreactive.

The catalysts useful in the process of our invention are organic compounds or organic complexes containing phosphorus. These compounds are discussed in *Organophosphorous Compounds*, by G. M. Kosolapoff, J. Wiley & Sons, (1950). The catalysts can be represented by the generalized formula $R^2_4Y$ in which Y is a carboxylate,

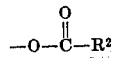

or a halogen, and where halogen can be fluorine, chlorine, bromine, or iodine; P is phosphorus; and the $R^2$ groups are the organic radicals of my catalysts. $R^2$ is used to designate various hydrocarbyl radicals including alkyl, cycloalkyl, aryl, and combinations thereof, such as aralkyl, alkaryl, and the like. The $R^2$ groups of any particular catalyst need not be the same but can be of two or three or even four different organic radicals. In general, for effectiveness of the catalysts and more particularly the solubility thereof, the hydrocarbyl radicals should be limited to up to eight carbon atoms per $R^2$ radical.

Generally, from about 0.001 to 1.5 moles of catalyst are employed per mole of the carboxylate salt, preferably from about 0.05 to 0.1 for optimum efficiency and conversion.

In general, temperatures in the range of from 20° to about 200° C. are employed in the esterification process according to our invention. Temperatures in a preferred range of from about 75° to 150° C. are quite effective. Pressure should be sufficient to maintain the reactants and admixtures of the reactants substantially completely in the liquid phase, and will usually be in the range of from about 0.5 to 10 atmospheres of pressure. Atmospheric pressure itself or only a little above is quite a convenience and generally is suitable. Reaction time sufficient to effect the degree of conversion desired should be employed. Normally, reaction times in the range of from about 15 minutes to about 24 hours, more usually 30 minutes to 3 hours, are satisfactory.

The equivalent ratio of the alkali metal carboxylate to the halocarbinol is generally in the range of from 1 to 25 moles of halocarbinol per mole of the carboxylate salt, preferably in the range of from 2.0 to 2.5 of halocarbinol to 1 mole of the carboxylate.

Preferably, the conversion should be effected substantially completely in the absence of water, i.e., under essentially anhydrous conditions in order to minimize undesirable side reactions. However, minor traces of water frequently found associated in one or other of the reactants normally do not unduly interfere.

Upon completion of the desired degree of conversion, the ester produced in my process can be recovered in any of the conventional manners familiar to one of skill in the art. Techniques such as filtration, stripping, solvent extraction, selective precipitation, and the like, can be employed as necessary or found convenient.

The esters produced according to the process of our invention are valuable products for commercial exploitation and particularly are useful for polymerization by conventional polyester polymerization techniques to form high molecular weight polymers particularly suitable for films, fibers, and the like.

The process of our invention can be demonstrated by the following examples. Examples should be considered as illustrative of reactants, and not as limitative.

EXAMPLE I

To a dry stirred autoclave was charged a mixture of 24.2 g (gram) (0.1 mole) dry dipotassium terephthalate, 16.9 g (0.21 mole) 2-chloroethanol, and 2.0 g (0.005 mole) ethyltriphenylphosphonium bromide as the catalyst, all in 60 ml (milliliters) of N,N-dimethylformamide as diluent. The system was flushed thoroughly with dry nitrogen. The rapidly stirred mixture was heated to 150° C. over an interval of about 0.5 hours and held at such temperature for approximately 2.5 hours. The system was cooled to room temperature, and the N,N-dimethylformamide removed in vacuo at approximately 50° C. and 1 mm pressure. This left a tan colored solution which solidified on standing overnight with a product of 29.4 g.

The solidified product was slurried in 50 ml of cold water and filtered. The solid residue on filtration was approximately 19 g of white solid. This material was then placed in a flask and dissolved in 125 ml of boiling hot water, and the solution was then filtered while hot to remove insoluble material.

Slow crystallization from the hot solution at natural cooling occurred resulted in 9.0 g of product as white platelets with a melting point of 105°–109° C. This material was identified by I.R. spectra and melting point comparisons to be bis(hydroxyethyl)terephthalate.

EXAMPLE II

To a dry stirred autoclave were added 18.1 g (0.083 mole) dry powdered dipotassium terephthalate, 3.7 g (0.01 mole) ethyl triphenylphosphonium bromide, and a solution of 13.7 g (0.170 mole) freshly distilled 2-chloroethanol in 40 ml of 2-butanone. 20 ml of N,N-dimethylformamide was added. The system was flushed with dry nitrogen. The stirred mixture was heated to 150° C. and held at that temperature for 2.5 hours, then cooled to room temperature.

The solid that precipitated, KCl, was filtered off, washed with 2-butanone, then dissolved in 75 ml of distilled water, and acidified with dilute HCl. No terephthalic acid precipitated, indicating complete conversion of the original dipotassium terephthalate.

The filtrate from the separation of the KCl was then subjected to vacuum for removal of the solvent, resulting in a yield of 21 g of crude bis(hydroxyethyl)terephthalate as identified by I.R.

EXAMPLE III

The same procedure including amounts of reactants as per Example II was followed except that no catalyst was used.

Acidification of an aqueous solution of the solid filtered from the cooled reaction mixture resulted in 8.8 g of terephthalic acid, 64 percent of the original, which indicated only a 36 percent conversion to other products.

Removal of the solvent in vacuo from the reaction mixture filtrate gave only 8.9 g or 42 percent yield of crude bis(hydroxyethyl)terephthalate as identified by I.R.

Examples are given in following paragraphs of reactants and catalysts useful according to the process of our invention, and are typical types according to the general formulas given previously. Such examples should not be considered limiting in any way, but should be considered illustrative of the compound types useful in the process of our invention.

Examples of alkali metal carboxylates which can be employed according to the process of our invention and which have been represented by the general formula

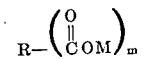

include:
 disodiumterephthalate
 dipotassiumterephthalate
 tripotassium-1,2,3-benzenetricarboxylate
 trisodium 1,2,4-benzenetricarboxylate
 trilithium 1,2,4-benzenetricarboxylate
 tripotassium 1,3,5-benzenetricarboxylate
 tetrapotassium 1,2,3,4-benzenetetracarboxylate
 tetrasodium 1,2,4,5-benzenetetracarboxylate
 tetrapotassium 1,2,3,5-benzenetetracarboxylate
 disodium 1,8-octanedicarboxylate
 trisodium 1,3,6-hexanetricarboxylate
 disodium 1,4-cyclohexane tricarboxylate
 tripotassium 1,3,6-cyclohexane tricarboxylate
 tetrasodium 1,2,7,8-octane tetracarboxylate
 tetrasodium 1,2,4,5-cyclooctane tetracarboxylate,
and the like.

Some examples of the halocarbinols which can be employed according to the process of our invention include:
 2-chloroethanol
 3-chloropropanol
 2-chloropropanol
 1-chloro-2-butanol
 1-chloro-3-butanol
 1-chloro-4-hydroxy-2-butene
 1-chloro-2-propanol
 α-chloro-α-hydroxy-p-xylene
 1-chloro-2-hydroxy-3-methylbutane
 2-bromoethanol
 2-bromopropanol
 1-bromo-3-butanol
 1-bromo-2-propanol
 1-bromo-2-hydroxy-3-methylbutane
 3-iodopropanol
 1-iodo-2-butanol
 1-iodo-4-hydroxy-2-butene
 α-iodo-α'-hydroxy-p-xylene
 3-bromo-4-ethyl-5-heptanol
 2-chloromethyl-1-octanol,
and the like.

Examples of the phosphonium catalysts represented by the generalized formula $R_4^2Y$ include the following:
 ethyltriphenylphosphonium chloride
 tetramethylphosphonium fluoride
 tetraoctylphosphonium bromide
 tetraethylphosphonium fluoride
 tetraphenylphosphonium iodide
 tetrabenzylphosphonium chloride
 tetra(3,5-dimethylphenyl)phosphonium bromide
 tetra(3-ethylcyclohexyl)phosphonium fluoride
 tetra(2-methylcyclopentol)phosphonium bromide
 dimethyldiphenylphosphonium iodide
and the equivalent benzoates, formates, acetates, and other carboxylates, and the like.

It frequently has been found preferable for the esterification reactions of our process to be effected in the presence of a gas which is substantially completely nonreactive within the reaction environment and including the reaction components. Such gases as nitrogen, helium, neon, argon, krypton, and low molecular weight saturated hydrocarbons such as methane, ethane, pentane and the like can be usefully employed.

Where desired for various purposes, reaction diluents can be employed in amounts comprising as much as 95 weight percent of the total reaction medium. Examples of materials suitably employed as diluents include acetone, methyl ethyl ketone, methyl isobutyl ketone, cyclohexanone, cyclodecanone, and other ketones; tetrahydropyran; hexane, octane, and similar saturated paraffin and cycloparaffin hydrocarbons of 5 to 10 carbon atoms; benzene, toluene, xylenes; tetrahydrofuran, N,N-dimethylformamide; and the like.

The examples and disclosure hereinabove have described the process of our invention, its effectiveness comprising our process and catalysts in production of highly useful esters.

Reasonable variations and modifications of our invention are possible within the scope of the disclosure, yet without departing from the spirit and scope thereof as has been disclosed in the specification hereinabove and the claims hereinafter.

That which is claimed is:

1. A process for preparing carbinol esters of carboxylic acids, which comprises reacting alkali metal carboxylate with (II) at least one halocarbinol which can be represented by

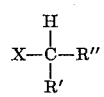

wherein R' is hydrogen, hydroxy-substituted hydrocarbyl or R", and R" is hydroxy-substituted hydrocarbyl wherein the active halogen of said halocarbinol is chlorine, bromine, or iodine, under esterification conditions, in the presence of an effective amount of a catalyst represented by $R_4^2PY$ wherein $R^2$ is a hydrocarbyl radical containing up to eight carbon atoms and is selected from at least one of alkyl, cycloalkyl, aryl combinations thereof, and wherein Y is selected from fluorine, chlorine, bromine, iodine, and

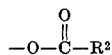

2. A process according to claim 1 wherein said (I) alkali metal carboxylate can be represented by

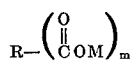

wherein $m$ is an integer of from 1 to 4 M is an alkali metal and is at least one of lithium, sodium, potassium, rubidium, and cesium, and the hydrocarbyl radical, R, of said carboxylate contains up to about 10 carbon atoms.

3. A process according to claim 1 wherein in said (II) halocarbinol R' plus R" have from 1 to 4 hydroxy groups and up to eight carbon atoms total.

4. A process according to claim 3 wherein is employed from 1 to 25 moles of said halocarbinol per mole of said carboxylate, and the amount of said catalyst employed is from 0.001 to 1.5 moles per mole of said carboxylate.

5. A process according to claim 4 wherein the said reaction is conducted at a temperature of from 20° to 200° C., at a pressure of from 0.5 to 10 atmospheres, and during a time of from 0.25 to 24 hours.

6. A process according to claim 5 wherein said temperature is from 75° to 150° C., said pressure is substantially atmospheric, and said time is from 0.5 to 3 hours.

7. A process according to claim 4 wherein said reaction is conducted in the presence of a gas substantially nonreactive to the reactants, and wherein said gas is nitrogen, helium, neon, argon, krypton, xenon, saturated hydrocarbons of from one to six carbon atoms, or mixtures thereof.

8. A process according to claim 4 wherein said reaction is conducted in the presence of a reaction diluent in an amount constituting up to 95 weight percent of the total weight of the reactants and said diluent, and wherein said diluent is acetone, methyl ethyl ketone, methyl isobutyl ketone, tetrahydropyran, cyclohexanone, benzene, saturated hydrocarbons of five to 10 carbon atoms, toluene, xylene, N,N-dimethylformamide, tetrahydrofuran, cyclodecanone, or mixtures of two or more thereof.

9. A process according to claim 4 wherein said carboxylate contains 2 carboxylate groups and said hydrocarbyl radical is aromatic.

10. A process according to claim 9 wherein said carboxylate is a terephthalate, said halocarbinol is a haloethanol, and said catalyst contains at least one phenyl group.

11. A process according to claim 10 wherein said terephthalate is dipotassium terephthalate, and said haloethanol is 2-chloroethanol.

12. A process according to claim 11 wherein said catalyst is ethyl triphenylphosphonium bromide.

* * * * *

UNITED STATES PATENT OFFICE

Case 19900 LHC

CERTIFICATE OF CORRECTION

Patent No. 3,676,484  Jack G. Scruggs and Donnie G. Brady       Dated July 11, 1972

It is certified that error appears in the above-identified patent and that said Letters Patent are hereby corrected as shown below:

Claim 1, column 5, line 18 (line 2 of claim 1) after "reacting" and before "alkali" should be --- (I) ---;

line 33 (line 14 of claim 1) after "aryl" at the beginning of the line should be --- , and ---.

Claim 2, column 6, line 1, after "4" and before "M" should be --- , ---;

line 3, after "radical" and before "R" delete --- , ---.

Signed and sealed this 9th day of January 1973.

(SEAL)
Attest:

EDWARD M. FLETCHER, JR.
Attesting Officer

ROBERT GOTTSCHALK
Commissioner of Patents